US007711747B2

(12) United States Patent
Renders et al.

(10) Patent No.: US 7,711,747 B2
(45) Date of Patent: May 4, 2010

(54) INTERACTIVE CLEANING FOR AUTOMATIC DOCUMENT CLUSTERING AND CATEGORIZATION

(75) Inventors: Jean-Michel Renders, Quaix en Chartreuse (FR); Caroline Privault, Montbonnot-St-Martin (FR); Ludovic Menuge, Meylan (FR)

(73) Assignee: Xerox Corporation, Norwalk, CT (US)

( * ) Notice: Subject to any disclaimer, the term of this patent is extended or adjusted under 35 U.S.C. 154(b) by 403 days.

(21) Appl. No.: 11/784,321

(22) Filed: Apr. 6, 2007

(65) Prior Publication Data

US 2008/0249999 A1    Oct. 9, 2008

(51) Int. Cl.
G06F 17/30 (2006.01)
(52) U.S. Cl. ...................... 707/771; 707/953
(58) Field of Classification Search ................. 707/102, 707/104.1, 4, E17.67
See application file for complete search history.

(56) References Cited

U.S. PATENT DOCUMENTS

| | | | |
|---|---|---|---|
| 6,003,027 A * | 12/1999 | Prager | 707/5 |
| 6,424,971 B1 | 7/2002 | Kreulen et al. | |
| 7,020,642 B2 * | 3/2006 | Ferguson et al. | 706/21 |
| 7,043,492 B1 | 5/2006 | Neal et al. | |
| 7,050,932 B2 | 5/2006 | Selby et al. | |
| 7,139,754 B2 | 11/2006 | Goutte et al. | |
| 2003/0101187 A1 | 5/2003 | Gaussier et al. | |
| 2006/0047617 A1 | 3/2006 | Bacioiu et al. | |
| 2006/0064415 A1 | 3/2006 | Guyon et al. | |
| 2006/0069667 A1 | 3/2006 | Manasse et al. | |
| 2006/0136410 A1 | 6/2006 | Goutte et al. | |
| 2007/0005340 A1 | 1/2007 | Goutte et al. | |
| 2007/0005639 A1 | 1/2007 | Gaussier et al. | |

FOREIGN PATENT DOCUMENTS

WO    0193067    12/2001

OTHER PUBLICATIONS

Wang et al., "Improving Chinese Text Categorization by Outlier Learning," IEEE, Proceedings of 2005 IEEE International Conference on Wuhan, China, pp. 602-607, Oct. 30, 2005.
Guyon et al., "Discovering Informative Patterns and Data Cleaning," American Association for Artificial Intelligence, pp. 3-23, (1996).

(Continued)

Primary Examiner—John E Breene
Assistant Examiner—Thu-Nguyet Le
(74) Attorney, Agent, or Firm—Fay Sharpe LLP (57) ABSTRACT

Documents are clustered or categorized to generate a model associating documents with classes. Outlier measures are computed for the documents indicative of how well each document fits into the model. Outlier documents are identified to a user based on the outlier measures and a user selected outlier criterion. Ambiguity measures are computed for the documents indicative of a number of classes with which each document has similarity under the model. If a document is annotated with a label class, a possible corrective label class is identified if the annotated document has higher similarity with the possible corrective label class under the model than with the annotated label class. The clustering or categorizing is repeated adjusted based on received user input to generate an updated model associating documents with classes. Outlier and ambiguity measures are also calculated at runtime for new documents classified using the model.

23 Claims, 3 Drawing Sheets

OTHER PUBLICATIONS

Hongyu et al. "Outlier Detection in Benchmark Classification Tasks," IEEE Internatioinal Conference on Toulouse, France, pp. V-557-V-560, Mary 14, 2006.

Andreoli et al, "Probabilistic Latent Clustering of Device Usage," IDA 2005, $6^{th}$ Int'l Symp. On Intelligent Data Analysis, Madrid, Spain, Dept. 8-12 (2005).

Gaussier et al., "A hierarchical model for clustering and categorizing documents," Proc. of the $24^{th}$ BCS-IRSG European Colloquium on IR Research (ECIR-02), Mar. 25-27, 2002.

The TDT2001 Task Definition and Evaluation Plan, NIST, version 1.2, Sep. 7, 2001.

Godbole et al., "Text Classification with Evolving Label-sets," Proc. of IEEE ICDM Conf. pp. 629-632, 2005.

Spinosa et al., "An online learning technique for coping with novelty detection . . . ," ICML 2006/Workshop on Knowledge Discovery from Data Streams, 2006.

Zhang et al., "A Probabilistic Model for Online Document Clustering . . . ," NIPS, 2004.

Baker et al., "A Hierarchical Probabilistic Model for Novelty Detection in Text," ICML, 1999.

Zhu et al., "Time-Sensitive Dirichlet Process Mixture Models," Carnegie Mellon University, 2005.

U.S. Appl. No. 11/312,764, filed Dec. 2005, Goutte.

U.S. Appl. No. 11/391,864, filed Mar. 2006, Guerraz.

Spanger et al., "Interactie Methods for Taxonomy Editing and Validation," Proc. $11^{th}$ Conf. on Information Knowledge Management, McLean, VA, US, pp. 665-668, 2002.

Yang et al., "Topic-conditioned Novelty Detection," Proc. $8^{th}$ aCM SIG KDD Int'l Conf Knowledge Discovery Data Mining, 2002.

Markou et al., "Novelty Detection: A Review," In Signal Processing V. 83, Issue 12, Dec. 2003.

Wang et al., "Topics over Time: A Non-Markov Continuous-Time Model of Topical Trends," Proc. $12^{th}$ ACM SIG KDD Int'l Conf. Knowledge Discovery Data Mining, 2006.

Klein et al., "From Instance-level Constraints to Space-level Constraints: Making the Most . . . ," Proc. $19^{th}$ Int'l. Conf. Machine Learning (ICML-2002), 2002.

Blei et al., "Dynamic Topic Models," Proc. $23^{rd}$ Int'l. Conf. on Machine Learning, Pittsburgh, PA, 2006.

\* cited by examiner

INTERACTIVE CLEANING FOR AUTOMATIC DOCUMENT CLUSTERING AND CATEGORIZATION

BACKGROUND

The following relates to the document organization, retrieval, and storage arts. It particularly relates to cleanup or adjustment of probabilistic categorization or clustering models generated by machine learning techniques, and is described with illustrative reference thereto. However, the following more generally relates to cleanup or adjustment of models for categorization or classification generally, and to runtime evaluation of how well a given document fits into the classification scheme.

The ability to store documents electronically has led to an information explosion. Information bases such as the Internet, corporate digital data networks, electronic government record warehouses, and so forth store vast quantities of information, which motivates development of effective information organization systems. Two commonly used approaches are categorization and clustering. In categorization, a set of classes are pre-defined, and documents are grouped into classes based on content similarity measures. Clustering is similar, except that no pre-defined classes are defined—rather, documents are grouped or clustered based on similarity, and groups of similar documents define the set of classes.

In an illustrative probabilistic approach, documents are each represented by a bag-of-words storing counts of occurrences of keywords, words, tokens, or other chunks of text, possibly excluding certain frequent and typically semantically uninteresting words such as "the" or "an". Document similarities and differences are measured in terms of the word counts, ratios, or frequencies. In a supervised approach, a model is generated by supervised training based on a set of annotated training documents. In an unsupervised approach, the training documents are partitioned into various classes based on similarities and differences. The training or partitioning generates probabilistic model parameters indicative of word counts, ratios, or frequencies characterizing the classes. Categorization is similar to clustering, except that rather than grouping training documents into classes the training documents are pre-assigned to classes based on their pre-annotated class identifications. Categorization is also sometimes called "supervised learning".

In automated classification or clustering approaches, the resulting model is typically good, but some documents may not fit well into any of the classes. This may or may not indicate that the document is inappropriate for the document classification scheme. For example, the document may be inappropriate in that it relates to a subject that is not intended to be covered by the document classification scheme. On the other hand, the document may relate to a subject that is to be covered, but the subject may be underrepresented in the set of training documents and so the underrepresented document does not match parameters of any of the classes as derived from the training documents. In the case of categorization, some documents may seem to fit better into a class other than the class to which the document is assigned based on its annotation. This may or may not indicate an erroneous class annotation.

CROSS REFERENCE TO RELATED PATENTS AND APPLICATIONS

The following related U.S. patent applications that commonly owned with the present application are each incorporated herein by reference:

Gaussier et al., U.S. application Ser. No. 09/982,236 filed Oct. 19, 2001 and published as U.S. Publ. Appl. No. 2003/0101187 A1 on May 29, 2003, is incorporated herein by reference in its entirety. This application relates at least to soft hierarchal clustering.

Goutte et al., U.S. application Ser. No. 10/774,966 filed Feb. 9, 2004 published as U.S. Publ. Appl. No. 2005/0187892 A1 on Aug. 25, 2005, and issued as U.S. Pat. No. 7,139,754, is incorporated herein by reference in its entirety. This application relates at least to multi-class, multi-label categorization using probabilistic hierarchal modeling.

Goutte et al., U.S. application Ser. No. 11/013,365 filed Dec. 15, 2004 and published as U.S. Publ. Appl. No. 2006/0136410 A1 is incorporated herein by reference in its entirety. This application relates at least to categorization decision-making.

Gaussier et al., U.S. application Ser. No. 11/170,033 filed Jun. 29, 2005 and published as U.S. Publ. Appl. No. 2007/0005639 A1 is incorporated herein by reference in its entirety. This application relates at least to multiple-view categorization.

Goutte et al., U.S. application Ser. No. 11/170,019 filed Jun. 29, 2005 and published as U.S. Publ. Appl. No. 2007/0005340 A1 is incorporated herein by reference in its entirety. This application relates at least to incremental training of a probabilistic classifier.

Goutte, U.S. application Ser. No. 11/312,764 filed Dec. 20, 2005 is incorporated herein by reference in its entirety. This application relates at least to techniques for determining class descriptors.

Guerraz et al., U.S. application Ser. No. 11/391,864 filed Mar. 29, 2006 is incorporated herein by reference in its entirety. This application relates at least to hierarchical clustering with real-time updating.

BRIEF DESCRIPTION

In accordance with certain embodiments illustrated herein, a document clustering or categorization system is configured to generate a model associating documents with classes. The document clustering or categorization system comprises: a probabilistic clusterer or categorizer; an outlier measure calculator; and a controller including a graphical user interface. The controller is configured to: (i) invoke the probabilistic clusterer or categorizer respective to a set of documents to generate a model associating documents with classes; (ii) invoke the outlier measure calculator to calculate outlier measures for the documents indicative of how well each document fits into the model generated by the probabilistic clusterer or categorizer; and (iii) identify to the user via the graphical user interface outlier documents whose corresponding outlier measures satisfy an outlier criterion selected by the user via the graphical user interface.

In accordance with certain embodiments illustrated herein, a document clustering or categorization method is disclosed comprising: performing probabilistic clustering or categorizing of a plurality of documents to generate a model associating documents with classes; computing outlier measures for the documents indicative of how well each document fits into the model; and identifying outlier documents to a user based on the computed outlier measures and a user selected outlier criterion.

In accordance with certain embodiments illustrated herein, a document clustering or categorization method is disclosed comprising: clustering or categorizing a plurality of documents to form a model associating documents with classes; computing ambiguity measures for the documents indicative of a number of classes with which each document has similarity under the model; and identifying an ambiguous document to a user as a document of the plurality of documents having similarity to two or more classes as indicated by the corresponding computed ambiguity measure.

DETAILED DESCRIPTION

Figure 1:
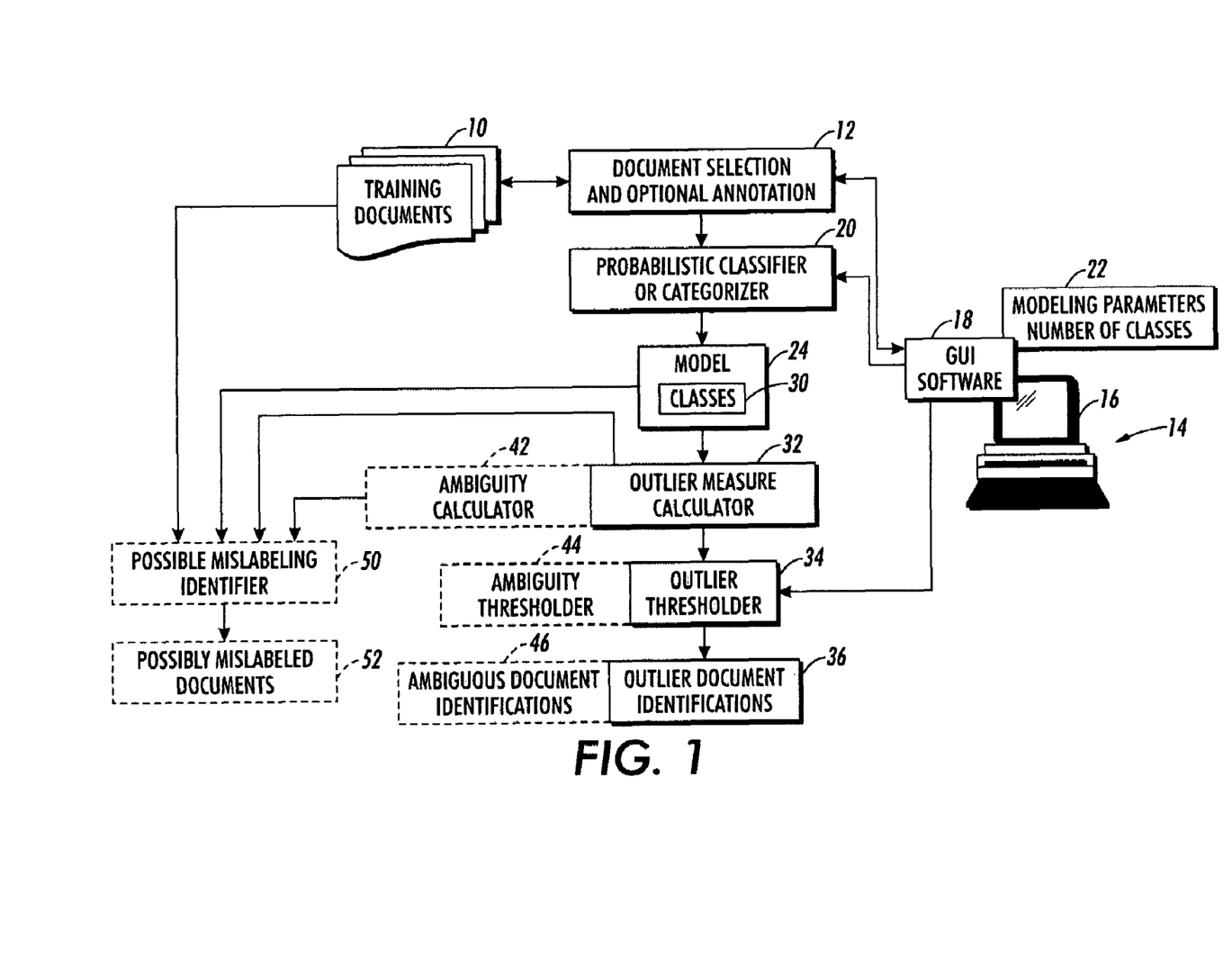
FIG. 1 diagrammatically shows an illustrative document clustering or classification system.

With reference to FIG. 1, a set of training documents 10 are input to a document selection and optional annotation interface 12. A user can control the clustering or categorization process via a controller that includes a graphical user interface 14, which in the illustrated embodiment is implemented as a computer 16 running suitable graphical user interface (GUI) software 18. The computer 16 may be a desktop computer, laptop or notebook computer, mainframe computer accessed via a dumb terminal, or so forth. The GUI software may, for example, be user interfacing software executing under a graphically based operating system such as Linux, UNIX, or other operating system running an X-window environment, or Mac OS (available from Apple Corp., Cupertino, Calif.), or a Windows operating system (available from Microsoft Corp., Redmond, Wash.), or so forth. Alternatively, the GUI software 18 may have integrated graphical display capability and execute under a command line based operating system. In a first pass, the user may employ the document selection interface 12 to select the documents comprising the set of training documents 10. The document selection interface 12 optionally provides other functionality, such as pre-filtering of the set of training documents 10 to remove documents unsuitable for the classifying. For example, if the classifying is to be applied to English-language documents, the pre-filtering may remove documents written in languages other than English. Similarly, pre-filtering may filter out documents outside of a selected date range, or having other undesired characteristics. If supervised document categorization is to be performed using documents pre-annotated with class identifications, then the user suitably applies such annotations via the document selection interface 12. In some embodiments, only some of the documents of the set of documents may be pre-annotated with class annotations, in which case a semi-supervised learning is to be performed.

The documents, optionally some or all of which include class annotations, are input to a probabilistic categorizer or classifier 20. In some embodiments, the probabilistic categorizer or classifier 20 performs clustering using probabilistic latent semantic analysis (PLSA). In some embodiments, the probabilistic categorizer or classifier 20 performs categorization using probabilistic latent categorization (PLC). The probabilistic categorizer or classifier 20 can in some embodiments operate in two modes: a supervised learning mode that performs categorization, or an unsupervised learning mode that performs clustering. In some embodiments, an intermediate mode providing semi-supervised learning is also available. In some embodiments, the mode of operation is determined by the constraints placed on the documents—if all documents are pre-annotated with class identifications which act as constraints on the learning, then supervised learning or categorization is operative. If no documents are pre-annotated, then clustering is operative. If some documents are pre-annotated with class identifications while others are not, then a semi-supervised learning mode is operative. In some embodiments, another clustering or categorization algorithm is used, such as naïve Bayes or latent Dirichlet allocation (LDA) generative modeling. In some embodiments, a hierarchical clustering or classification algorithm is used, such as hierarchical PLSA (HPLSA). The probabilistic categorizer or classifier 20 processes the set of training documents 10 in view of modeling parameters 22 such as a pre-set number of latent classes or pre-annotated document class identifications to generate a model 24 including a set of classes 30. The generated model includes probabilistic or statistical information for each class 30, and optionally also includes other parameters or information such as information about links between parent and child nodes.

In an illustrative PLSA or PLC clusterer or categorizer, the documents are represented in bag-of-words format. For a given document, its bag of words representation is a set or collection of vocabulary words with associated occurrence counts. The vocabulary words or tokens may be all words or tokens in the document, or may be a selected sub-set of the words or tokens in the document, such as words or tokens occurring at least a threshold number of times in the documents, words or tokens of the document excluding certain common words or tokens such as "and" or "the", words containing more than a threshold number of letters, or so forth. As used herein, the terms "words" or "tokens" are to be broadly and interchangeably construed as encompassing any selected character strings or chunks of text used in decomposing the document for probabilistic or statistical analysis. For example, a "word" or "token" may as used herein correspond to a single linguistic word, a phrase, a sentence, an n-gram (that is, a group of n contiguous words), a natural language grammatical element such as a noun phrase or named entity, or so forth. In some embodiments, a PLSA or PLC framework employs probabilistic or statistical parameters such as class probabilities P(C) associated with classes 30 (a class being generically denoted by the symbol "C" or "c" herein), class-conditional document probabilities or profiles P(d|C) (a document being generically denoted by the symbol "d" herein), and class-conditional word probabilities or profiles P(w|C) (a vocabulary word or token being generically denoted by the symbol "w" herein). Definitions of some illustrative probabilistic or statistical parameters are given in Equation (1):

$$P(C) = \frac{N_C}{N}, \quad P(d|C) = \frac{|d|}{N_C}, \quad P(w|C) = \frac{N_{wC}}{N_C}, \quad (1)$$

where N is a count of occurrences of vocabulary words in the entire set of documents 10 (multiple repetitions of a particular vocabulary word being counted multiply), $N_C$ is the number of occurrences of vocabulary words in all documents belonging to category "C", |d| is the number of occurrences of vocabulary words in document "d", and $N_{wC}$ is the number of occurrences of a particular vocabulary word "w" in documents belonging to the category "C". Equivalently, the model can employ probabilistic parameters P(d) and P(c|d) (that is, the probability that document d belongs to class c). These are illustrative examples, and it is contemplated to use additional or other probabilistic or statistical model parameters. This "maximum likelihood" approach is an example approach for computing probabilistic or statistical parameters. Other approaches, such as maximum a posteriori approach, lead to other probabilistic or statistical parameter equations. In some embodiments, the probabilistic or statistical model parameters are normalized or otherwise modified to enhance computational aspects. The probabilistic or statistical parameters of Equation (1) are ratios; however, it will be appreciated that the stored probabilistic or statistical model parameters may be actual counts such as $N_C$ or |d|, with desired ratios being readily computed from the actual counts.

In flat categorization, the training documents 10 are pre-annotated, and parameters such as those of Equation (1) are readily computable. For clustering or other learning where document class assignments are not fully determinable from the pre-annotation, documents are clustered into latent classes so as to satisfy a selected expectation maximization (EM) or other optimization criterion. The clustering algorithm attempts to group or cluster documents into classes such that the documents in each class have substantially similar bag-of-words representations. The class-conditional word probabilities for a given class then provide a probabilistic or statistical expectation of what to expect for bag-of-words representations of other documents belonging to that class. Either hard or soft clustering may be employed. In hard clustering, each document is assigned to a single class. Referring to Equation (1), hard clustering has the consequence that P(c|d)=0 for all classes to which document "d" is not assigned, and P(c|d)=1 for that class to which document "d" is assigned. In soft clustering, a document may partially belong to more than one class, in which case P(c|d) has a value between 0 and 1 with larger values indicating a higher probability that the document "d" belongs to that class.

The resulting model 24 includes the set of classes 30 each having selected probabilistic or statistical parameters such as class conditional word probabilities P(w|C). If the set of documents 10 is suitably representative, the class-conditional word probabilities for an illustrative for class $C_1$, denoted $P(w|C_1)$, should be representative of documents of the class $C_1$. In the case of categorization, in addition to the documents 10 being representative it should further be the case that the annotated class identifications are correct—that is, documents assigned by annotation to a given class should be representative of that class.

The generated model 24 can be used to classify a new document "$d_{new}$", which was not included in the set of training documents 10. The new document "$d_{new}$" has document-conditional word probabilities $P(w|d_{new})$, where $P(w|d_{new})$ denotes the number of occurrences of vocabulary word "w" in the document $d_{new}$ divided by the number of vocabulary words in the document "$d_{new}$". If the new document "$d_{new}$" belongs to a class $C_1$ of the set of classes 30, then it should follow that the document-conditional word probabilities $P(w|d_{new})$ should be similar to corresponding class-conditional word probabilities $P(w|C_1)$. The model provides a probabilistic or statistical basis or measure for assigning the new document "$d_{new}$" to a closest one of the classes 30, in the case of hard partitioning, or to a closest one or more classes in the case of soft partitioning.

Although it is generally expected that the set of documents 10 is substantially representative, and (in the case of categorization) that the annotated class identifications are correct, it is recognized herein that discrepancies may be present. For example, some irrelevant documents may have been included in the set of training documents 10. As an example of such a case, consider an illustrative set of training documents relating to sports, in which one document relating to politics is inadvertently included. It is likely that the document relating to politics will not fit well into any of the classes 30. Similarly, in an illustrative categorization example, if a document relating to golf is erroneously annotated as relating to tennis, it is likely that the document-conditional word probabilities P(w|d) for the erroneously labeled golf document will diverge greatly from the class-conditional word probabilities of the tennis class.

As another example, consider clustering of documents relating to sports, in which there are documents relating to six sports: "tennis", "golf", "cricket", "baseball", "basketball", and "football" but the pre-set number of classes 22 is only five. Depending upon the detailed clustering processing, one possible result is that the documents relating to the five sports: "tennis", "golf", "cricket", "baseball", and "basketball", cluster properly into the five allowed latent classes, but the documents relating to the sixth sport "football" have no available class and hence are fitted, albeit poorly, into the five extant latent classes. The result of such a situation is likely to be that the documents relating to "tennis", "golf", "cricket", "baseball", and "basketball" will have a good fit to their categories (that is, the document-conditional word probabilities will align well with the corresponding class-conditional word probabilities) while the "football" documents will have a substantially poorer fit.

With continuing reference to FIG. 1, such deficiencies in the set of documents 10, or in the modeling parameters 22, are addressed after the clustering by a cleanup system as follows. An outlier measure calculator 32 computes outlier measures for the documents of the set of documents 10, and based on the outlier measures an outlier thresholder 34 or other outlier identification algorithm interactively identifies outlier documents that do not fit into the model 24 as indicated by the outlier measures. In some embodiments, the outlier thresholder 34 operates interactively in that a user can select the outlier threshold that is compared with the outlier measures to determine which documents are deemed to be outliers. The outlier thresholder 34 or other outlier identification algorithm outputs outlier document identifications 36 that are displayed or otherwise indicated to the user via the GUI interface 14.

An optional ambiguity calculator 42 is included with the outlier measure calculator 32 to compute an ambiguity measure for a document indicative of whether the document is ambiguous in that it is probabilistically or statistically similar to more than one class of the model. The distinction between an outlier and an ambiguous document is that an outlier document does not fit well into any class of the model 24, whereas an ambiguous document fits well into more than one class of the model 24. An ambiguous document has an ambiguity measure that is higher than a threshold, such as unity. An ambiguity thresholder 44 or other identification algorithm identifies ambiguous documents 46 based on the ambiguity measures, and the identified ambiguous documents 46 are optionally displayed or otherwise indicated to the user via the GUI interface 14.

In the case of supervised or semi-supervised learning, a document may be annotated with a class label. In such a case, the correctness of the class label is also optionally considered. A possible mislabeling identifier 50 identifies possibly mislabeled documents 52 as those documents that fits into another class better than into the labeled class is optionally identified as a possibly mislabeled document, and the better fitting class is suggested as a corrective class label.

The outlier document identifications 36, optional ambiguous document identifications 46, and optional potential mislabeling identifications 52, are displayed to the user via the GUI interface 14. The outlier documents are outliers in that they do not fit into the model 24 as indicated by the outlier measures. However, the significance of outlier status is not readily apparent. In some cases, the outlier document may be a document that should not have been included in the set of training documents 10. As an illustrative example, the set of training documents may be sports-related documents, and the outlier document may be a financial document that should not have been included. On the other hand, the outlier document may be a document that should have been included, but which belongs to a class that is underrepresented in the set of training documents 10. As an illustrative example, the set of training documents may be sports-related documents, and the outlier document or documents may be a document, or a few documents, relating to cricket, in which the sample of documents is too small to adequately represent articles of the class "cricket". In such a case, the appropriate remedy may not be removal, but rather addition of additional documents relating to cricket in the set of training documents so as to make the updated set of training documents 10 more representative of the entire sports subject area including cricket. As yet another possibility, if clustering is used and the pre-set number of classes is smaller than the actual number of classes represented by the set of training documents 10, then the result may be that documents in an area that is adequately represented in the set of training documents 10 nonetheless does not fit into the model 24. As an illustrative example, the set of training documents may be sports-related documents, and the outlier documents may be an adequate sampling of documents relating to cricket, but if the preset number of classes is too small then these cricket-related documents may be allocated to other classes representative of other types of sports, and hence be outliers respective to the model 24. In such a case, the best remedy may be neither removal of the cricket documents nor addition of additional cricket documents, but rather an increase in the pre-set number of classes so as to accommodate the cricket documents.

Rather than attempting to automatically decide how to process the outlier documents, the outlier document identifications 36 are made to the user via the GUI interface 14. The user can then select outlier documents for removal, or can select to add additional documents to the set of training documents 10 to make the updated set of documents more representative, or can select to change the pre-set number of classes 22 or other parameters of the model, or so forth. In the case of categorization in which the optional ambiguous document identifications are made, the user can select to assign an ambiguous document to another class. Once the user makes the selected changes, the probabilistic classifier or categorizer 20 is re-run respective to the set of training documents incorporating the user updates, so as to generate an updated model that better represents the documents 10. The documents are again analyzed respective to the updated model to identify outlier documents and optionally to identify ambiguous documents. This process is optionally repeated iteratively two or more times, until the user is satisfied with the resulting model and selects acceptance of the model. The accepted model is thenceforth available for use in retrieving documents, classifying new documents, or so forth.

Having described a general document organizational system having a cleanup component with general reference to FIG. 1, some illustrative embodiments are now set forth in additional detail.

The illustrated embodiments employ as the clusterer or categorizer 20 a probabilistic latent categorizer (for categorization) or probabilistic latent semantic analyzer (for clustering). The {term, document} matrix (or equivalently, after normalizing by the total number of observations, "the empirical joint distribution of terms and words"), is modeled using a mixture of multinomials:

$$P(w, d) = \sum_C P(c)P(w|c)P(d|c) = \sum_C P(c|d)P(w|c)P(d). \quad (2)$$

The probabilistic or statistical model parameters used for the illustrative embodiment are: the probability P(C) of each class C; the probability P(d|C) of each document d given each class C; and the probability P(w|C) of each word w given each class C, also called the "profile" of the class. Algebraic definitions are given in Equation (1). These parameters are obtained during an unsupervised, semi-supervised, or supervised training phase, by maximizing the likelihood of the data using a variant of the Expectation-Maximization algorithm or another suitable optimization. See, for example, Gaussier et al., "A hierarchical model for clustering and categorising documents" in Advances in Information Retrieval—Proceedings of the 24th BCS-IRSG European Colloquium on IR Research (ECIR-02), Mar. 25-27, 2002 (Lecture Notes in Computer Science 2291, pp. 229-247, Springer) which is incorporated herein by reference in its entirety, for description of some such known techniques.

Optionally, the model 24 can incorporate a set of classes 30 that are hierarchical, for example arranged as a tree structure. In one illustrative approach for providing hierarchical structure in a clustering context, the clusterer or categorizer 20 is applied in a clustering mode to cluster documents to generate a flat model, and then the classes of the flat model are organized hierarchically by adding intermediate classes each encompassing, or serving as nodes for, two or more leaf classes. The unsupervised training generates the probabilistic or statistical modeling parameters for the flat classes, which will be the leaves of the tree-type hierarchy. Leaf classes of the hierarchy are directly associated with documents. Intermediate classes from which leaf classes depend either directly or indirectly also have associated probabilistic modeling parameters such as the example probabilities P(c), P(d|c) and P(w|c) (where lower-case "c" here indicates a non-leaf class). In one computationally simple approach for non-leaf classes, P(c)=0 for all non-leaf classes c, indicating that no documents are directly contained by the non-leaf class c, and P(d|c) and P(w|c) are the weighted averages of the corresponding parameters of its children or descendents, that is:

$$P(w|c) = \frac{\sum_{C \downarrow c} P(w|C) \cdot P(C)}{\sum_{C \downarrow c} P(C)},$$

and $$P(d|c) = \frac{\sum_{C \downarrow c} P(d|C) \cdot P(C)}{\sum_{C \downarrow c} P(C)},$$

In another illustrative approach for generating hierarchical structure, after an initial clustering operation, a selected class which encompasses two or more topics is re-run through the clusterer 20 to generate leaf classes. The documents of the selected class are then moved into the leaf classes such that the selected class is empty, and the documents are contained in the generated leaf classes. In yet another approach suitable in the categorization context, the entire hierarchical structure including the leaf nodes or classes and the non-leaf nodes or classes is provided a priori by the user along with class annotations for the documents, and the supervised training respects the class annotations and the hierarchical links provided by the user without making any changes in the hierarchical structure. The result of the supervised learning in this case is inherently hierarchical, since the user-supplied hierarchy is respected during the supervised learning process. Gaussier et al., U.S. Publ. Appl. No. 2003/0101187 A1 describes other soft hierarchical clustering approaches. The foregoing are merely examples, and other approaches for introducing a hierarchy into the model can be used.

After the first run of the clusterer or categorizer 20, each document is in a processed form supporting the so-called bag-of-words representation ("bow") in which the document is represented by a word-frequency vector, list, or the like, ignoring positions of words in the document. For example, a suitable word-frequency vector representation is:

$$\text{bow}(d) = \{(w_1, n(w_1)), \ldots, (w_i, n(w_i)), \ldots, (w_{Nd}, n(w_{Nd}))\} \quad (5),$$

where $w_i$ is a word and $n(w_i)$ is the number of occurrences of this word in the document d. Let $\mathcal{W}$ be the dictionary or vocabulary of the model, that is, the set of vocabulary words encountered over all the bag-of-words within the set or collection of documents 10. In some embodiments, some words such as infrequent or short words may have been filtered out and not kept in the dictionary or vocabulary when building the model. In some embodiments, words which are not vocabulary words are retained in the bow representations, so that the bow representations may contain some words $w_i$ that are not included in the vocabulary $\mathcal{W}$. For computational efficiency these excluded words are optionally combined as in a single fictive word, called "unknown word", so that it is sufficient to count the number of non-vocabulary words without keeping them in memory.

With continuing reference to FIG. 1, the various aspects of cleanup and model fit quality analysis, namely outlier analysis, ambiguous document analysis, and mislabeled document analysis, are described in turn with reference to the illustrative model example just described.

Considering first some illustrative measures of outlierness, a probability matrix p(c|d) is suitably computed a posteriori from the model for each document d in the collection. These probabilities are used to compute outlier measures indicative of how far a document d is from the data set or, in other words, how likely it is, given the observation the whole training set 10 and the model 24. Two illustrative outlier measure formulations are set forth herein: one based on cross-entropy or negative log-likelihood between the empirical word distribution of the document d and the distribution predicted by the model 24:

$$CE(d) = -\sum_{w_i \in d} \frac{n(w_i)}{|d|} \log \left( \sum_{c=1,\ldots,K} p(c|d)\hat{p}(w_i|c) \right), \quad (6)$$

and the other based on the Kullbach-Leibler divergence between these two distributions:

$$KL(d) = -\sum_{w_i \in d} \frac{n(w_i)}{|d|} \log \frac{\sum_{c=1,\ldots,K} p(c|d)\hat{p}(w_i|c)}{\frac{n(w_i)}{|d|}} = CE(d) - H(d) \quad (7)$$

with $H(d) = \text{Entropy} = -\sum_{w_i \in d} \frac{n(w_i)}{|d|} \log \frac{n(w_i)}{|d|}$.

Typically, only a single outlier measure formulation (e.g., CE or KL or another selected outlier measure formulation) is used to compute the outlier measures. Both CE and KL are set forth herein to provide two different illustrative examples. The summations in Equations (6) and (7) are over all words, both in the vocabulary $\mathcal{W}$ and the fictive "unknown" word. The document length |d| is the total number of word occurrences in the document "d", including occurrences of "unknown" words. The term $\hat{p}(w_i|c)$ arises as follows. In the illustrative PLSA or PLC analysis, no smoothing mechanism is included. The term $\hat{p}(w_i|c)$ takes into account the presence of "unknown" words. In a suitable approach, a Jelinek-Mercer smoothing scheme is applied and the term $\hat{p}(w_i|c)$ is defined as:

$$\hat{p}(w_i|c) = \alpha \cdot p(w_i|c) + (1-\alpha) \cdot p_b(w_i) \quad (8).$$

Other approaches are also contemplated, such as using Dirichlet smoothing or absolute-discounting. In Equation (8), $p(w_i|c)$ is the parameter value as estimated by the non-smoothed PLSA algorithm. The term $p(w_i|c)$ is null for the fictive "unknown" word. The term $p_b(w_i)$ is a back-off distribution on words. Various reasonable choices can be selected for the back-off distribution $p_b(w_i)$, such as $p_b(w_i)=1$ for the unknown word and zero for all vocabulary words $\mathcal{W}$, or a uniform choice of $$p_b(w_i) = \frac{1}{|\mathcal{W}|+1}$$

for all indices i. Both of these illustrative back-off distributions have been found to give very similar results with suitable choice of the $\alpha$ smoothing factor for Equation (8).

Outlier measures computed using the outlier measure formulation of Equation (6), or computed using the outlier measure formulation of Equation (7), measure how likely it is that document d could be generated by the underlying distribution or model 24 of the collection of documents 10. The two illustrative outlier measure formulations of Equations (6) and (7) both range from 0 to +∞, with the value for the "more likely" documents being theoretically zero, and the value for unlikely documents, that is, outlier documents, being large. The Kullbach-Leibler divergence KL(d) can be seen as the distance between the empirical position of the document d in the feature space and the ideal one, that is, the one smoothed or predicted by the model 24.

Either of the illustrative outlier measure formulations are suitably computed by the outlier measure calculator 32 to rank the documents of the set of training documents 10. The outlier thresholder 34 then makes outlier document identifications 36 as those documents whose outlier measures exceed a threshold. The threshold can be a fixed threshold, such as KL(d)>T where T is the fixed threshold. Alternatively, the threshold can be a variable threshold defined to select those documents whose outlier measures constitute a selected top percentile of the training documents 10, such as a top 1% or 5%. The outlier document identifications 36 are presented to the user via the GUI interface 14.

Figure 2:
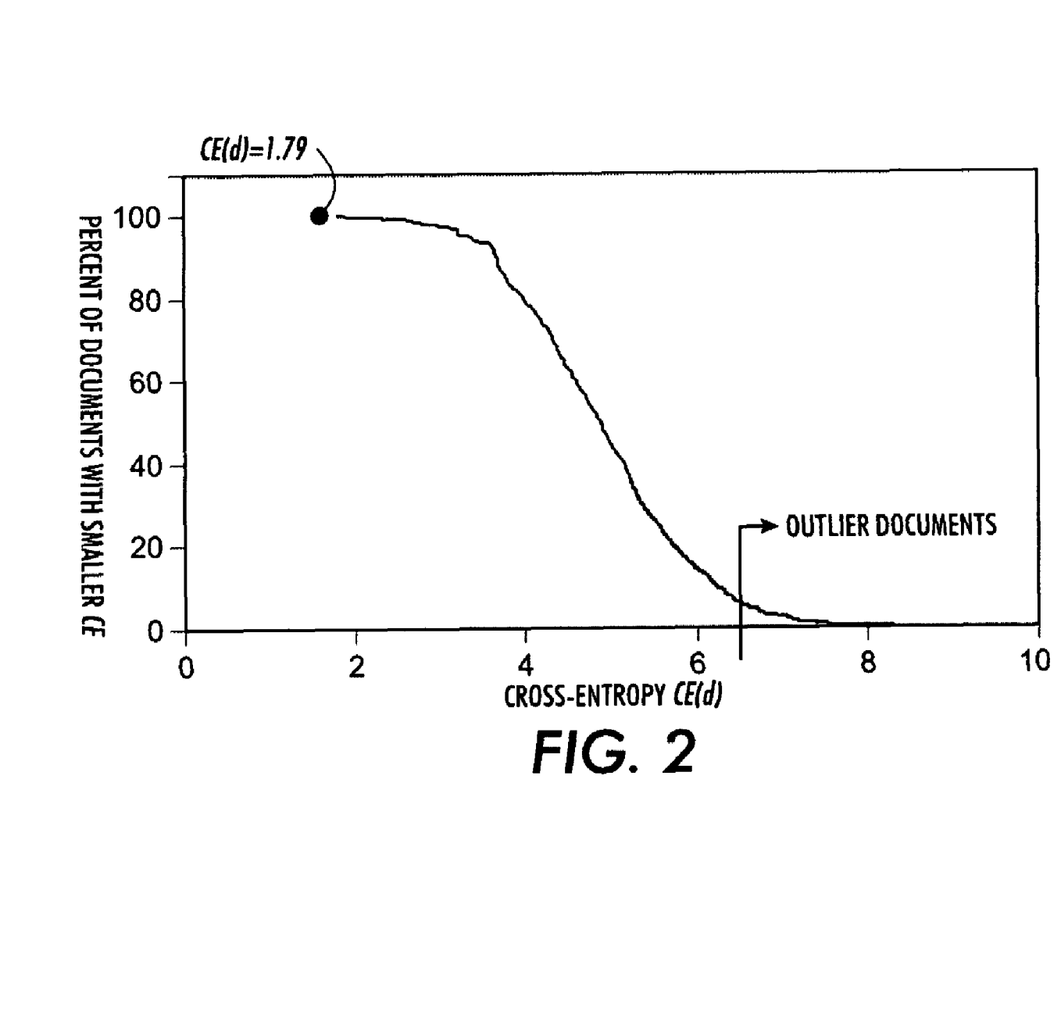
FIG. 2 diagrammatically shows a cumulative histogram of outlier measure values for a set of documents modeled by clustering or categorization then analyzed for outliers using a cross-entropy-based outlier measure formulation.

With reference to FIG. 2, a cumulative histogram of cross-entropy outlier measure values (CE(d) as set forth in Equation (6)) are plotted for a training set of 1732 documents. The largest CE outlier measure value encountered on this collection was 8.29, and 100% of the documents had an associated outlier measure larger than or equal to 1.79. With this cumulative histogram, it is seen that, for example, a document whose outlier measure value is 4 has a percentage of "likeliness" of nearly 80% (that is, 20% of outlier-ness). For the data set of FIG. 2, an outlier threshold of CE(d)>6.15 corresponds to defining outlier documents as those documents whose outlier measure lies in the top five percentile.

An illustrative example of ambiguity measurement is next described. Some illustrative examples of the optional ambiguity calculator 42 make use of the exponential of the class entropy, using the P(c|d) values for a document d, as identified by the PLSA or PLC analysis via the Expectation-Maximization algorithm. The resulting illustrative ambiguity measure formulation is:

$$Ambi(d) = \exp\left(-\sum_C p(c|d) \Box \log[p(c|d)]\right), \quad (9)$$

where Ambi(d) denotes the ambiguity measure for document d. The value of this illustrative ambiguity measure is greater than or equal to one. If Ambi(d)=1 then the document d is completely assigned to a single class under the model, which represents the limit of no ambiguity whatsoever. Maximal ambiguity using this formulation is Ambi(d)=K where K is the number of classes, which indicates that the document d is equally likely to belong to any of the classes 30 under the model. In effect, the ambiguity measure indicates the number of classes with which the document has similarity under the model—for an unambiguous classification, this ambiguity measure should be close to one.

An illustrative example of possible mislabeling identification is next described. In the case of supervised or semi-supervised learning, if a document is mislabeled the ambiguity measure can be used to detect this situation and present it to the user. In a suitable approach, the probabilistic model is generated. Then, for each document d of the set of documents 10 the model 24 is used to compute the estimated value of $\hat{p}(c|d)$, the outlier measure (for example, using CE as set forth in Equation (6) or KL as set forth in Equation (7)), and the ambiguity measure Ambi(d). The values of $\hat{p}(c|d)$ are ranked along class c by decreasing value. Then, defining $c_{label}$ to be the index of the category label manually assigned to d and $r_{label}$ its rank in the sorted p(c|d) list, the following algorithm is applied by the possible mislabeling identifier 50. If the outlier thresholder 34 indicates that document d is not an outlier document and if additionally the ambiguity thresholder 44 indicates that $(r_{label}-Ambi(d))>T_a$ where $T_a$ is a selected threshold for ambiguity (such as $T_a=0.5$ which is suitable using the illustrative ambiguity measure formulation of Equation (9)), then the document d is considered to be likely to have been mislabeled, and the document d identification is included in the set of possibly mislabeled document identifications 52. In such a case, the alternative class $c_1=\text{argmax}(\hat{p}(c|d))$ is proposed to the user via the GUI interface 14 as an alternative category for correction. If the condition $(r_{label}-Ambi(d))>T_a$ is not met, then the document d is deemed likely to have been labeled properly. In some embodiments, the corrective action associated with identification of a mislabeled document is to allow the user to either confirm or invalidate the model suggestion $c_1$ for the potentially mislabeled document d. The new class assignment $c_1$ is then used as a pre-set model parameter for the subsequent update categorization.

In a hierarchical model, the word profiles of the components are derived for different levels of a hierarchy. That is, a word used in a document can be associated not only with a leaf node or leaf class, but also with hierarchical ancestors of the leaf class within a tree-like class hierarchy. In an illustrative embodiment, the hierarchical model is given by:

$$P(w, d) = \sum_c P(c)P(d|c)\sum_{v \geq c} P(w|v)P(v|c) = P(d)\sum_c P(c|d)\sum_{v \geq c} P(w|v)P(v|c), \quad (10)$$

where the notation v≥c designates all ancestors of node c including c itself. The hierarchical levels can be thought of as different vocabulary levels, which offers interesting and useful aspects to extending the outlier measures and thresholding to the hierarchical case. Consider a wholly irrelevant document respective to the set of training documents 10. The document is wholly irrelevant in that it has no similarities to the other documents, other than the fact that it is written in English. This commonality of language, however, ensures that such a document inherently shares some similarity with the documents of the training set 10, because they are all written in English. Removing this "general English" similarity contribution can enhance the precision of the outlier detection algorithms. More generally, this approach can be applied at different levels or portions of the hierarchy. For example, outlier documents may be detected inside some selected branches of the hierarchy tree. For instance, given some prior knowledge that a document belongs to some broad topic, it may be useful to determine whether the document is an outlier document within that broad topic. In the following, the outlier analysis is conditioned with respect to a high level node μ. The high level node μ may be the root node, or an intermediate node. The following hierarchical extensions can be derived for the respective illustrative CE and KL outlier measures:

$$CE(d, \mu) = -\sum_{w_i \in d} \left( \frac{\frac{n(w_i)}{|d|} - q(\mu|d)\hat{p}(w_i|\mu)}{1 - q(\mu|d)} \right) \quad (11)$$

$$\cdot \log \left( \frac{1}{1 - q(\mu|d)} \sum_{c=1,\ldots,K} p(c|d) \sum_{c \leq v < \mu} p(v|c)\hat{p}(w_i|v) \right),$$

and $$KL(d, \mu) = -\sum_{w_i \in d} \left( \frac{\frac{n(w_i)}{|d|} - q(\mu|d)\hat{p}(w_i|\mu)}{1 - q(\mu|d)} \right) \cdot \log \quad (12)$$

$$\left( \frac{\sum_{c=1,\ldots,K} p(c|d) \sum_{c \leq v < \mu} p(v|c)\hat{p}(w_i|v)}{\frac{n(w_i)}{|d|} - q(\mu|d)\hat{p}(w_i|\mu)} \right) = CE(d, \mu) - H(d, \mu)$$

with $$H(d, \mu) = -\sum_{w_i \in d} \left( \frac{\frac{n(w_i)}{|d|} - q(\mu|d)\hat{p}(w_i|\mu)}{1 - q(\mu|d)} \right)$$

$$\cdot \log \left( \frac{\frac{n(w_i)}{|d|} - q(\mu|d)\hat{p}(w_i|\mu)}{1 - q(\mu|d)} \right)$$

and $$q(\mu|d) = \sum_c p(c|d)p(\mu|c).$$

Having set forth some illustrative examples of the outlier measure calculator 32, the ambiguity calculator 42, and the possible mislabeled documents identifier 50, some illustrative embodiments of the user response configuration of the GUI interface 14 are now described. Regarding outlier documents, possible responses include: (i) removing an outlier document (a suitable response if the outlier document is not relevant to the subject matter to be cataloged); (ii) adding additional documents similar to an outlier document (a suitable response if the outlier document relates to subject matter that is underrepresented in the set of documents 10); grouping outlier documents together (a suitable response if it appears the generated model failed to capture the class represented by the outlier documents); or changing the number of latent classes. In the case of an ambiguous document, the user may want to affirmatively assign a label to an ambiguous document. In the case of a mislabeled document, the user may want to assign a corrective label. Once such user adjustments are made, the modeling is repeated with an optionally revised documents set (i.e., with certain outlier documents deleted by the user or with additional documents added by the user) and optional user-added constraints such as corrected or added class labels for certain documents or a revised number of latent classes. The repeated modeling provides an updated model which is again analyzed for outlier documents, ambiguous documents, and possibly mislabeled documents, and the process is repeated until a model that is acceptable to the user is achieved.

Figure 3:
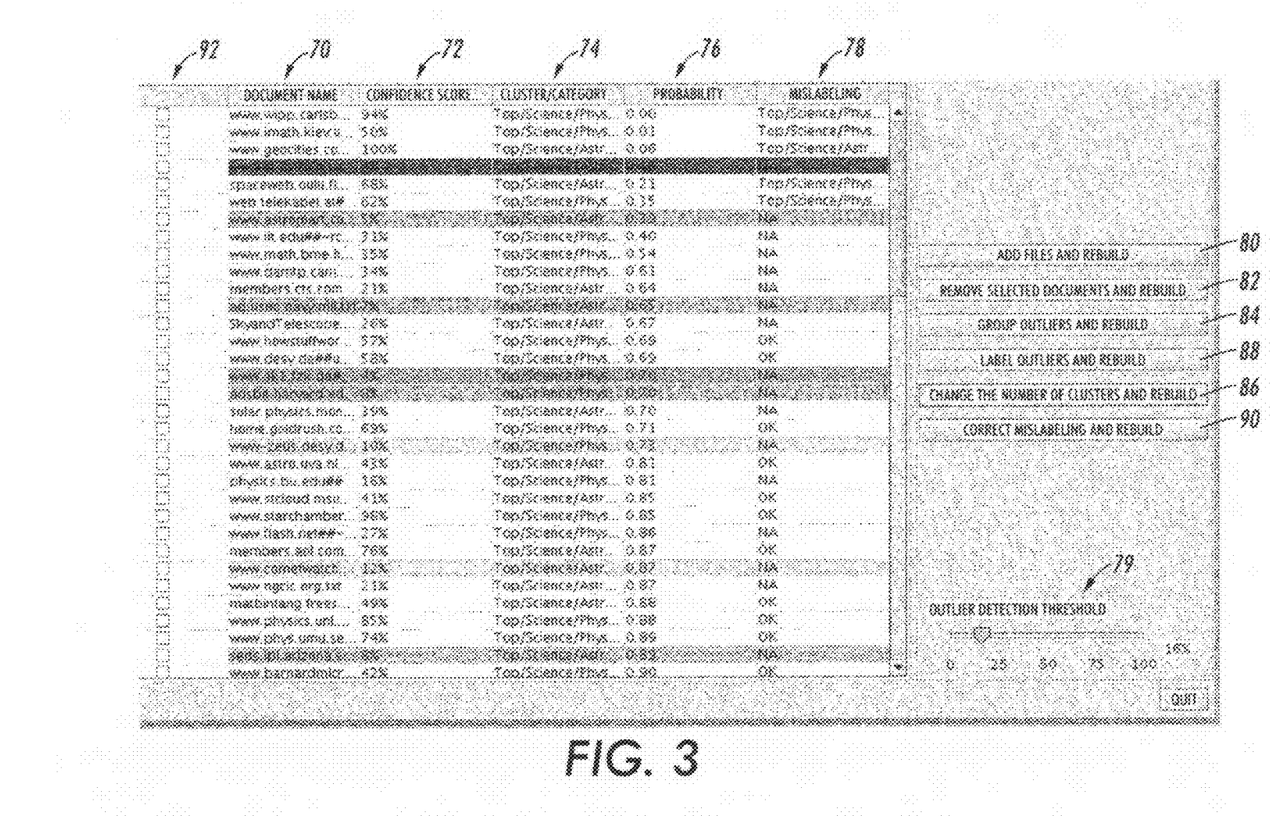
FIG. 3 shows an illustrative display of the graphical user interface of the system of FIG. 1 enabling a user to make corrections or adjustments based on interactively identified outlier documents and automatically identified ambiguous documents.

With reference to FIG. 3, a GUI display is illustrated that is suitable for providing the user with a process report in which the outlier document identification 36 is made interactively with user input. The main area of the display includes five titled columns: "Document name" 70, "Confidence score (%)" 72, "Cluster/Category" 74, "Probability" 76, and "Mislabeling" 78. The "Document name" column 70 identifies the document. The "Confidence score (%)" column 72 identifies the outlier measure value expressed as a percentage—values below a threshold value set by a slider 79 in the lower right-hand corner of the display are grayed, with the amount of graying indicative of the lack of confidence. The "Cluster/Category" column 74 defines the class to which the document is assigned. This class is either the cluster computed by the model in unsupervised mode (that is, clustering mode) or the pre-annotated category label assigned by the user in supervised mode (that is, categorization mode). The "Probability" column 76 identifies the a posteriori probability as a percentage. The a posteriori probability is the probability P(c|d) computed by the model that the document belongs to the class identified in column 74. The "Mislabeling" column 78 identifies, in the case of supervised or semi-supervised learning only, the proposed new class assignment if the possible mislabeling identifier 50 identified a document as possibly mislabeled. The display also includes option buttons on the right-hand side including an "add files and rebuild" button 80, a "remove selected documents and rebuild" button 82, a "Group outliers and rebuild" button 84 (suitable in a clustering operation), a "Change the number of clusters and rebuild" button 86, a "Label outliers and rebuild" button 88 (suitable in a semi-supervised clustering operation), and a "Correct mislabeling and rebuild" button 90 (suitable in a supervised categorization operation). A checkboxes column 92 provides a checkbox to the left of each document name to enable the user to select which documents to which the operation applies (e.g., add, remove, group, label, or correct mislabeling).

The GUI display of FIG. 3 facilitates a semi-automatic process, in which the identification of outlier documents (and optionally of possibly mislabeled documents) is automated, but the choice of what to do with those identified outlier or possibly mislabeled documents is left to the user. The idea is not to have a fully automatic process but to point the user to some particular documents in the set of documents 10 so as to get the user's corrections or adjustments before running an update clustering or categorization process to build an update model. It is recognized herein that a fully automated process would inherently rely on the assumption that the model structure, such as the number of classes and the groupings of documents, is correct—accordingly it would be paradoxical to use such an assumed-to-be-correct model to infer deficiencies in the documents or model parameters from which the model was derived by machine learning. Accordingly, a semi-automated process such as the illustrated process is believed to be advantageous.

In the GUI display of FIG. 3, the outlier threshold for use by the outlier thresholder 34 is selectable via the lower right-hand slider 79. A threshold of between about 1% and about 5% is expected to be a good typical value, depending upon the size of the training set 10. Using the GUI display of FIG. 3, the user opens and checks one or more documents using the checkboxes column 92, and then chooses among the various right-hand side selection buttons 80, 82, 84, 86, 88, 90.

Selection of the "Remove selected documents and remove" button 82 enables the user to confirm that the checked documents should be removed from the set of training documents 10. The controller then invokes the clusterer or classifier 20 respective to the set of documents less the selected one or more outlier documents.

Selection of the "Group outliers and rebuild" button 84 is available only in clustering or semi-supervised learning modes, and enables the user to confirm that the checked documents are outliers, but they are documents that should be part of the model. The user has no similar sample documents to provide but intends that the checked documents be put together in a particular class (for example, having a default name of "Other"). The clustering is re-executed on the same set of documents 10, but with pre-set model parameters including labeling the checked documents with a common pre-annotated class name. This is, in effect, a semi-supervised mode taking into account the grouping of the checked documents. The effect is to gather the checked outlier documents together, by which it is meant that they will be constrained to be in the same latent class during the next clustering iteration. Potentially, the semi-supervised clustering may move additional documents to the common class to which the checked documents are assigned (e.g., the class default-named "Other").

Selection of the "Label outliers and rebuild" button 88 is available only in clustering mode, and enables the user to confirm that the checked documents are outliers, but they are documents that should be part of the model. The user labels the checked documents with a class label. The controller re-invokes the clusterer 20 to rebuild the model 24.

Selection of the "Add files and rebuild" button 80 enables the user to add additional documents to the set of documents 10 to make the set of documents more representative. In this case the user typically discovers that the outlier documents are of a type that should be included in the model, but which are currently under-represented in the set of documents 10. Accordingly, the user adds one or more documents of this type to the collection (with the corresponding label, in case of supervised mode). Selection of the documents for addition is suitably done using a file selection dialog box (not shown). If the GUI interface software 18 is running under a general-purpose operating system such as Linux/X-Window, Mac OS, or Windows, then the file selection dialog box preferably comports with the file selection dialog box style of that operating system, although a custom file selection dialog box configuration is also contemplated. When the "Add files and rebuild" button 80 is selected, the clusterer or categorizer 20 is invoked respective to the set of documents plus the one or more additional documents to generate an updated model.

Selection of the "Change the number of clusters and rebuild" button 86 is available only when clustering. Selection of this button indicates that the user does not want to modify the set of training documents 10, but rather wants to adjust the number of classes. Selection of this button results in the presentation of a dialog box (not shown) by which the user can select to increase or decrease the number of classes. In some embodiments, the dialog box enables a numerical input of the number of classes, which provides the user with freedom to select any number of classes (optionally limited by practical considerations, such as the number of classes being greater than one and less than the total number of documents). In other embodiments, the dialog box includes a button to increase the number of classes by one and another button to decrease the number of classes by one. This approach sacrifices some flexibility for greater convenience. Other dialog configurations are also contemplated. Once the number of classes is adjusted, the controller repeats the invocation of the clusterer or classifier 20 to perform clustering respective to the unmodified set of documents 10 but with the different number of classes as a pre-set modeling parameter. For instance by increasing the number of classes, outliers can be moved to smaller and potentially "better fitting" classes.

Selection of the "Correct mislabeling and rebuild" button 90 enables the user to confirming or invalidate the new class assignment suggestions provided in the rightmost "Mislabeling" column 78 of the display of FIG. 3. Those documents that are checked via the checkboxes column 92 are correc-
tively annotated using the suggested label, while the suggested label is discarded for the unchecked documents. In a more complex embodiment, for each checked box a dialog window (not shown) is presented to the user so that the user can select the corrective class annotation from a list, preferably with the suggested class highlighted, set as the default option, or otherwise emphasized in the dialog window. The categorizer 20 is re-invoked with these updated class annotations. This option is also contemplated for use in clustering, in which case a semi-supervised clustering is performed to generate the updated model, in which the clustering is constrained by the selected new class assignment suggestions.

The illustrated corrective or adjusting user selections are examples. In the illustrated embodiment, selection of a corrective action or adjustment automatically initiates an updating invocation of the clusterer or categorizer 20, which has the effect of performing one adjustment per iteration. In other contemplated embodiments, two or more such corrections or adjustments may be made in a single iteration. This can be accomplished, for example, by modifying the GUI interface to enable the user to make multiple corrective actions or adjustments, and then to invoke the clusterer or categorizer 20 using a separate "rebuild" button (not shown) to rebuild the model. For example, in such an embodiment the user might select removal of certain outlier documents, addition of additional documents, and an increase the number of classes, and only after making all three selection would then invoke the next iteration clustering or categorizing using the "rebuild" button.

Other corrective actions besides the illustrated examples are also contemplated. Advantageously, the outlier documents are highlighted (using graying in FIG. 3, for example) so that the user can focus on the outlier documents which are the documents most likely to draw corrective action or adjustment. In FIG. 3, the darkness of the graying is indicative of how far above outlier threshold the document outlier measure is. In other embodiments, all outlier documents may be indicated equally regardless of the specific outlier measure value, for example by placing an asterisk before the name of each outlier document listed in the "document name" column 70 (feature not shown).

A further advantage of the illustrated approach of presenting the user with outlier document identifications (and, optionally, possibly mislabeled document identifications) is that the user may obtain a better understanding of the set of documents and the content represented by these documents. In the embodiment of FIG. 3, it is noted that while the outlier documents are highlighted, the user has check boxes available for all documents, along with the "Confidence score" column providing a quantitative measure of the outlier measure—accordingly, the user can make adjustments not directed toward the identified outlier documents. For example, the user can elect to remove a document not identified as an outlier document by the outlier thresholder 34. In other contemplated embodiments, user selections may be limited to the outlier documents, or may be limited to outlier or possibly mislabeled documents.

It is also contemplated to adjust the outlier measures without re-running the clustering or categorization when the model 24 is updated structurally. Such structural updates can include, for example, splitting a class into two or more smaller classes, merging two or more classes into a single larger class, moving a document from one class to another class, or so forth. Such structural updates can be performed in some instances without re-executing the clustering or categorization, or can be performed by applying the clustering or categorization to only an affected portion of the class structure. For example, a split of a class into two separate classes can be performed by performing clustering limited to documents of the class to be split. As another example, moving a document from one class to another can be performed by algebraically updating the parameters of Equation (1) only for the affected classes and any ancestor classes. Other such structural updates performed without a complete rebuild are disclosed in co-pending application Guerraz, U.S. application Ser. No. 11/391,864 filed Mar. 29, 2006 which is incorporated herein by reference, and Equation (11) or Equation (12) can be applied in conjunction with these updates to update the outlier measure values.

In some embodiments, updates of the outlier measures can be suitably made by approximating soft clustering scores by the hard clustering scores. Trials performed on sample corpora suggest that passing from the outlier measure distribution based on soft partitioning to one based on hard partitioning does not significantly impact the performance.

In the case of a hierarchical structure update, It can be shown that it is sufficient to update the outlier measures of only those classes involved in the structural update. In a suitable approach, the model parameters are updated for the affected classes, and the new $\hat{p}(w|c(d))$ profiles are computed for the affected classes. Using these new probabilistic or statistical model parameters, the affected outlier measures are adjusted according to:

$$CE(d) = -\sum_{w_i \in d} \frac{n(w_i)}{|d|} \Box \log[\hat{p}(w_i|c(d))], \quad (13)$$

in the case of the illustrative cross-entropy outlier measure formulation, or according to:

$$KL(d) = -\sum_{w_i \in d} \frac{n(w_i)}{|d|} \Box \log \frac{\hat{p}(w_i|c(d))}{\frac{n(w_i)}{|d|}} = CE(d) - H(d), \quad (14)$$

in the case of the illustrative Kullbach-Leibler divergence outlier measure formulation.

In the foregoing, the outlier and ambiguity measures have been applied during iterative development of the model 24. However, these measures can also be used at runtime, for example when using the model to categorize a new document that is not a member of the original set of training documents 10. In such a case, an iterative expectancy maximization (EM) algorithm or other categorization algorithm is used to classify the new document into a best-fit class (in the case of hard partitioning) or probabilistically into one or more best fitting classes (in the case of soft partitioning). The cross-entropy, divergence, or other suitable outlier measure is optionally computed by the outlier measure calculator 32 for the new document and compared with the user-selected outlier threshold by the outlier thresholder 34 (which optionally may be a different threshold than that used during iterative model development) to determine whether the newly categorized document is an outlier document respective to the model 24. In such a case, the GUI interface 14 informs the user that, although the new document has been assigned a best-fit class under the model, the fit is poor as indicated by the outlier measure.

In similar fashion, during runtime the ambiguity calculator 42 optionally calculates the ambiguity measure for a newly categorized document. If the ambiguity measure indicates that the document fits well into more than one class, instead of into a single class, then the GUI interface informs the user that, although the new document has been assigned a best-fit class under the model, there is another class (or perhaps two or more other classes, depending upon the value of the ambiguity measure) into which the new document also fits well.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A document clustering or categorization system comprising:
   a probabilistic clusterer or categorizer;
   an outlier measure calculator; and
   a controller including a graph ca user interface, the controller configured to:
   (i) invoke the probabilistic clusterer or categorizer respective to a set of documents to generate a model associating documents with classes,
   (ii) invoke the outlier measure calculator to calculate outlier measures for the documents indicative of how well each document fits into the model generated by the probabilistic clusterer or categorizer,
   (iii) identify to the user via the graphical user interface outlier documents whose corresponding outlier measures satisfy an outlier criterion selected by the user via the graphical user interface,
   (iv) subsequent to the identifying (iii), receive from the user via the graphical user interface a user input selecting a change in the set of documents, a constraint on the probabilistic clusterer or categorizer, or an acceptance of the model,
   (v) updating the model by invoking the probabilistic clusterer or categorizer respective to the set of documents adjusted by the user input to update the model, and
   (vi) repeat operations (ii)-(v) until the user input selects acceptance of the model.

2. The document clustering or categorization system as set forth in claim 1, wherein the graphical user interface includes a display and the controller is still further configured to display a document selected by a user through user interaction with the accepted model via the graphical user interface.

3. The document clustering or categorization system as set forth in claim 1, wherein responsive to the user input selecting one or more outlier documents for removal, the controller performs the model update operation (v) respective to the set of documents less the selected one or more outlier documents.

4. The document clustering or categorization system as set forth in claim 1, wherein responsive to the user input selecting one or more additional documents for addition to the set of documents, the controller performs the model update operation (v) respective to an updated set of documents including the one or more additional documents.

5. The document clustering or categorization system as set forth in claim 1, wherein responsive to the user input comprising a constraint that selected outlier documents be grouped together, the controller performs the model update operation (v) respective to the set of documents with the constraint that the selected outlier documents be grouped together.

6. The document clustering or categorization system as set forth in claim 1, wherein at least one document of the set of documents is a labeled document having an annotated label class, the system further comprising:

a mislabeled documents identifier configured to identify a possibly mislabeled document that is probabilistically or statistically more similar under the model to a class other than the label class, the controller further configured to invoke the mislabeled documents identifier to identify to the user via the graphical user interface possibly mislabeled documents.

7. The document clustering or categorization system as set forth in claim 1, further comprising:

an ambiguous documents identifier configured to identify ambiguous documents that are probabilistically or statistically similar to two or more classes under the model, the controller further configured to invoke the ambiguous documents identifier to identify to the user via the graphical user interface ambiguous documents.

8. The document clustering or categorization system as set forth in claim 1, wherein the outlier criterion comprises an absolute or percentile outlier threshold selected by the user via the graphical user interface such that the identifying (iii) identifies to the user via the graphical user interface outlier documents whose corresponding outlier measures are beyond the user-selected absolute or percentile outlier threshold.

9. The document clustering or categorization system as set forth in claim 1, wherein the outlier measure calculator calculates the outlier measures as cross-entropy or Kullbach-Leibler divergence parameters indicative of how well each document fits into one or more classes of the model generated by the probabilistic clusterer or categorizer.

10. The document clustering or categorization system as set forth in claim 1, wherein the controller is further configured to invoke the outlier measure calculator respective to a new document not part of the set of documents to calculate an outlier measure for the new document indicative of how well the new document fits into the model generated by the probabilistic clusterer or categorizer.

11. A document clustering or categorization method comprising:

performing probabilistic clustering or categorizing a plurality of documents to generate a model associating documents with classes;

computing outlier measures for the documents indicative of how well each document fits into the model;

identifying outlier documents to a user based on the computed outlier measures and a user selected outlier criterion;

receiving user input from the user selecting a change in the plurality of documents, a constraint on the clustering or categorizing, or an acceptance of the model;

repeating the performing of clustering or categorizing adjusted based on the received user input to generate an updated model associating documents with classes; and iterating the computing of outliner measures, the identifying of outline documents, the receiving of user input, and the repeating of the performing of clustering or categorizing until the user accents the undated model.

12. The document clustering or categorization method as set forth in claim 11, further comprising:

selecting a document for viewing using the updated model associating documents with classes; and viewing the selected document.

13. The document clustering or categorization method as set forth in claim 11, wherein the user input selects one or more of the identified outlier documents for removal, and the repeating of the performing of clustering or categorizing comprises:

repeating the clustering or categorizing of the plurality of documents less the one or more selected outlier documents.

14. The document clustering or categorization method as set forth in claim 11, wherein the user input selects one or more additional documents for addition to the plurality of documents, and the repeating of the performing of clustering or categorizing comprises:

repeating the clustering or categorizing of the plurality of documents plus the one or more additional documents.

15. The document clustering or categorization method as set forth in claim 11, wherein the clustering or categorizing comprises clustering, the number of classes is a constraint on the clustering, the user input selects a changed number of classes, and the repeating of the performing of clustering or categorizing comprises:

repeating the clustering of the plurality of documents using the changed number of classes.

16. The document clustering or categorization method as set forth in claim 11, wherein the clustering or categorizing comprises clustering, the user input includes a constraint that selected outlier documents be grouped together, and the repeating of the performing of clustering or categorizing comprises:

repeating the clustering of the plurality of documents with the constraint that the selected outlier documents be grouped together.

17. The document clustering or categorization method as set forth in claim 11, further comprising:

identifying an ambiguous document that is probabilistically or statistically similar to two or more classes instead of a single class.

18. A document clustering or categorization method comprising:

performing probabilistic clustering or categorizing a plurality of documents to generate a model associating documents with classes;

computing outlier measures for the documents indicative of how well each document fits into the model; and identifying outlier documents to a user based on the computed outlier measures and a user selects a change in the plurality of documents, a outlier criterion, or an acceptance of the model;

wherein an annotated document of the plurality of documents is constrained to a label class during the performing of probabilistic clustering or categorizing, and the method further comprises:

identifying a best fitting class based on the generated model for the annotated document;

conditional on the best fitting class being different from the label class, identifying the best fitting class as a possible corrective label class for the annotated document;

receiving user input from the user selecting the corrective label class for the annotated document; and repeating the performing of clustering or categorizing to generate an undated model associating documents with classes until the user accents the undated model, wherein the annotated document is constrained to the corrective label class during the repeated performing of probabilistic clustering or categorizing.

19. The document clustering or categorization method as set forth in claim 18, wherein the identifying of a possible corrective label class is performed further conditional upon the annotated document not being identified as an outlier document.

20. The document clustering or categorization method as set forth in claim 11, further comprising:
   computing ambiguity measures for the documents indicative of a number of classes with which each document has similarity under the model; and
   identifying an ambiguous document to a user as a document of the plurality of documents having similarity to two or more classes as indicated by the corresponding computed ambiguity measure.

21. The document clustering or categorization method as set forth in claim 11, wherein an annotated document of the plurality of documents is constrained to a label class during the performing of probabilistic clustering or categorizing, and the method further comprises:
   identifying a possible corrective label class other than the label class for the annotated document, the annotated document having higher similarity with the possible corrective label class under the model than with the annotated label class.

22. The document clustering or categorization method as set forth in claim 21,
   wherein the identifying of a possible corrective label class is performed conditional upon the annotated document not being identified as an outlier document.

23. The document clustering or categorization method as set forth in claim 20, further comprising:
   computing an ambiguity measure respective to a new document that is not part of the plurality of documents used to form the model; and
   identifying a classification of the new document as ambiguous conditional upon the value of the ambiguity measure computed respective to the new document.

* * * * *